(12) United States Patent
Chen et al.

(10) Patent No.: US 12,476,465 B1
(45) Date of Patent: Nov. 18, 2025

(54) METHOD FOR POWER DISTRIBUTION CONTROL IN MICROGRID SYSTEM INTEGRATING ELECTRICITY, HYDROGEN, AND AMMONIA, AND DEVICE

(71) Applicant: Foshan Xianhu Laboratory, Guangdong (CN)

(72) Inventors: Jing Chen, Guangdong (CN); Chihua Lu, Guangdong (CN); Chun Xiao, Guangdong (CN); Hao Zheng, Guangdong (CN); Linqiang Su, Guangdong (CN); Xinbao Wang, Guangdong (CN); Binyu Xiong, Guangdong (CN); Yifei Wang, Guangdong (CN); Xijian Cui, Guangdong (CN); Junbo Fu, Guangdong (CN); Bo Yang, Guangdong (CN); Yonggang Liu, Guangdong (CN); Xixiu Wu, Guangdong (CN); Yuliang Hu, Guangdong (CN); Junjie Zhao, Guangdong (CN); Huchuan Yang, Guangdong (CN); Zhuo Wang, Guangdong (CN); Congding Yang, Guangdong (CN); Xiaoteng Ren, Guangdong (CN); Yanwen Zhang, Guangdong (CN); Hang Shu, Guangdong (CN); Kai Hu, Guangdong (CN)

(73) Assignee: FOSHAN XIANHU LABORATORY, Guangdong (CN)

( * ) Notice: Subject to any disclaimer, the term of this patent is extended or adjusted under 35 U.S.C. 154(b) by 0 days.

(21) Appl. No.: 19/266,339

(22) Filed: Jul. 11, 2025

(30) Foreign Application Priority Data

Jul. 16, 2024 (CN) .......................... 202410953274.6

(51) Int. Cl.
*H02J 3/38* (2006.01)
*G05B 17/02* (2006.01)

(52) U.S. Cl.
CPC ................ *H02J 3/38* (2013.01); *G05B 17/02* (2013.01); *H02J 2300/24* (2020.01)

(58) Field of Classification Search
CPC .......... H02J 3/38; H02J 2300/24; G05B 17/02
See application file for complete search history.

(56) References Cited

U.S. PATENT DOCUMENTS

2014/0174080 A1\* 6/2014 Friesth .................... F03G 4/035
60/516
2014/0229031 A1 8/2014 Amarin et al.
(Continued)

FOREIGN PATENT DOCUMENTS

CN 109755965 A 5/2019
CN 113410832 A \* 9/2021 .............. H02J 3/388
(Continued)

OTHER PUBLICATIONS

International Search Report and Written Opinions of the International Searching Authority issued for the PCT application No. PCT/CN2024/113363 on Apr. 9, 2025 with English translation.
(Continued)

*Primary Examiner* — Charles Cai
(74) *Attorney, Agent, or Firm* — Gottlieb, Rackman & Reisman, PC

(57) ABSTRACT

A method for power distribution control in a microgrid system integrating electricity, hydrogen, and ammonia, and a device are disclosed. The method includes: acquiring an output power of the photovoltaic generation system and a power of the DC load and determining a charge/discharge power of a hybrid energy storage system constituted the hydrogen storage system and the electrochemical energy
(Continued)

storage system; and acquiring a state of charge (SOC) value of the electrochemical energy storage system and a state of health (SOH) value of the hydrogen storage system, and determining a power distribution control strategy according to the charge/discharge power of the hybrid energy storage system to adjust an operating status of the power distribution control strategy.

8 Claims, 3 Drawing Sheets

(56) References Cited

U.S. PATENT DOCUMENTS

| | | |
|---|---|---|
| 2020/0056290 A1 | 2/2020 | Yang et al. |
| 2023/0087546 A1 | 3/2023 | Cheng et al. |

FOREIGN PATENT DOCUMENTS

| | | |
|---|---|---|
| CN | 114374220 A | 4/2022 |
| CN | 115473279 A | 12/2022 |
| CN | 116505566 A | 7/2023 |
| CN | 117134409 A | 11/2023 |
| CN | 117220310 A | 12/2023 |
| CN | 118214091 A | 6/2024 |
| CN | 118889561 A | 11/2024 |

OTHER PUBLICATIONS

First Office Action for the family patent No. 202410953274.6 on Dec. 10, 2024 with English translation.
First Search report for the family patent No. 202410953274.6 on Dec. 3, 2024 with English translation.
Supplementary Search report for the family patent No. 202410953274.6 on Feb. 11, 2025 with English translation.
Zhao Na et al; "Capacity Optimization Allocation Method of Wind/Solar/Hydrogen/Storage Microgrid Based on Improved Honey Badger Algorithm"by Zhao Na et al, on May 31, 2024, published on Journal of electrical engineering.
Wang Jing et al., "Optimal design of electricity-hydrogen energy storage systems for renewable energy penetrating into chemical process systems" by Wang Jing et al, on Nov. 28, 2019, published on CIESC Journal 2020, vol. 71, issue 3.

* cited by examiner

METHOD FOR POWER DISTRIBUTION CONTROL IN MICROGRID SYSTEM INTEGRATING ELECTRICITY, HYDROGEN, AND AMMONIA, AND DEVICE

CROSS-REFERENCE TO RELATED APPLICATION

This application is based on and claims the benefit of priority from Chinese Patent Application No. 2024109532746, filed on 16 Jul. 2024, the entirety of which is incorporated by reference herein.

TECHNICAL FIELD

The present disclosure relates to the technical field of microgrids, and in particular to a method for power distribution control in a microgrid system integrating electricity, hydrogen, and ammonia, and a device.

BACKGROUND

A microgrid system is a small electricity generation and distribution system composed of distributed power sources, energy storage devices, energy conversion devices, loads, monitoring and protection devices, etc. It is an autonomous system that can achieve self-regulation, protection, and management, and can be connected to an external grid or operate independently. Considering the limited capacity of energy storage devices in the microgrid system, how to effectively and dynamically coordinate and control the operating statuses of related devices in the microgrid system to ensure the stable and safe operation of the microgrid system is an urgent technical problem to be solved.

SUMMARY

The present disclosure provides a method for power distribution control in a microgrid system integrating electricity, hydrogen, and ammonia, and a device, to at least provide a beneficial choice or create conditions for solving one or more technical problems in conventional technologies.

In accordance with a first aspect of the present disclosure, an embodiment provides a method for power distribution control in a microgrid system integrating electricity, hydrogen, and ammonia, where the microgrid system includes: a direct current (DC) bus; an energy router; an ammonia cracking hydrogen production system; a hydrogen storage system; and a photovoltaic generation system, a water electrolysis hydrogen production system, a hydrogen fuel cell system, an electrochemical energy storage system, and a DC load, which are connected to the DC bus through the energy router, where the DC bus is connected to an external alternating current (AC) bus through the energy router, the ammonia cracking hydrogen production system and the hydrogen storage system are respectively connected to the external AC bus, the ammonia cracking hydrogen production system and the water electrolysis hydrogen production system are respectively connected to the hydrogen storage system, the hydrogen storage system is connected to the hydrogen fuel cell system, and the hydrogen storage system and the electrochemical energy storage system constitute a hybrid energy storage system, and the method includes:

acquiring an output power of the photovoltaic generation system and a power of the DC load, to determine a charge/discharge power of the hybrid energy storage system;

acquiring a state of charge (SOC) value of the electrochemical energy storage system and a state of health (SOH) value of the hydrogen storage system, to determine a power distribution control strategy for the microgrid system in combination with the charge/discharge power of the hybrid energy storage system; and adjusting an operating status of the microgrid system according to the power distribution control strategy.

Further, determining a power distribution control strategy for the microgrid system includes:

acquiring a normal SOC range ($SOC_{min}$, $SOC_{max}$) of the electrochemical energy storage system and determining a first relationship between the SOC value of the electrochemical energy storage system and the normal SOC range;

acquiring a normal SOH range ($SOH_{min}$, $SOH_{max}$) of the hydrogen storage system and determining a second relationship between the SOH value of the hydrogen storage system and the normal SOH range;

in response to the charge/discharge power of the hybrid energy storage system being greater than zero, determining a first power distribution control strategy according to the first relationship and the second relationship, where the first power distribution control strategy includes controlling the electrochemical energy storage system to be charged and/or controlling the water electrolysis hydrogen production system to produce hydrogen; and in response to the charge/discharge power of the hybrid energy storage system being less than zero, determining a second power distribution control strategy according to the first relationship and the second relationship, where the second power distribution control strategy includes controlling the electrochemical energy storage system to discharge and/or controlling the hydrogen fuel cell system to generate electricity.

Further, the first power distribution control strategy further includes:

in response to $SOC(t) \leq SOC_{min}$ and $SOH(t) \leq SOH_{min}$, or in response to $SOC_{min} < SOC(t) < SOC_{max}$ m $SOH_{min} < SOH(t) < SOH_{max}$, and the charge/discharge power of the hybrid energy storage system being greater than or equal to a rated maximum output power of the electrochemical energy storage system, setting the rated maximum output power of the electrochemical energy storage system as a first power reference value, setting a difference between the charge/discharge power of the hybrid energy storage system and the rated maximum output power of the electrochemical energy storage system as a second power reference value, controlling the electrochemical energy storage system to be charged according to the first power reference value, and controlling the water electrolysis hydrogen production system to produce hydrogen according to the second power reference value;

in response to $SOC(t) \leq SOC_{min}$ and $SOH_{min} < SOH(t) < SOH_{max}$, or in response to $SOC(t) \leq SOC_{min}$ and $SOH(t) \geq SOH_{max}$, or in response to $SOC_{min} < SOC(t) < SOC_{max}$ and $SOH(t) \geq SOH_{max}$, setting the charge/discharge power of the hybrid energy storage system as a third power reference value, and controlling the electrochemical energy storage system to be charged according to the third power reference value;

in response to $SOC_{min} < SOC(t) < SOC_{max}$ and $SOH(t) \leq SOH_{min}$, or in response to $SOC(t) \geq SOC_{max}$ and $SOH(t) \leq SOH_{max}$, or in response to $SOC(t) \geq SOC_{max}$ and $SOH_{min}<SOH(t)<SOH_{max}$, controlling the water electrolysis hydrogen production system to produce hydrogen according to the third power reference value;

in response to $SOC_{min}<SOC(t)<SOC_{max}$, $SOH_{min}<SOH(t)<SOH_{max}$, and the charge/discharge power of the hybrid energy storage system being less than the rated maximum output power of the electrochemical energy storage system, controlling the electrochemical energy storage system to be charged according to the third power reference value; and in response to $SOC(t) \geq SOC_{max}$ and $SOH(t) \geq SOH_{max}$, setting a product of the charge/discharge power of the hybrid energy storage system and a given consumption coordination coefficient as a fourth power reference value, and controlling the water electrolysis hydrogen production system to produce hydrogen according to the fourth power reference value.

Further, the microgrid system further includes a hydrogen load connected to the hydrogen storage system; and in response to $SOC(t) \leq SOC_{min}$ and $SOH(t) \geq SOH_{max}$, or in response to $SOC_{min}<SOC(t)<SOC_{max}$ and $SOH(t) \geq SOH_{max}$, controlling the electrochemical energy storage system to be charged according to the third power reference value, and at the same time, starting the hydrogen load to operate.

Further, in response to $SOC(t) \geq SOC_{max}$ and $SOH(t) \geq SOH_{max}$, the water electrolysis hydrogen production system is controlled to produce hydrogen at the fourth power reference value, and at the same time, the microgrid system is connected to a grid to feed back an alternating current to the external AC bus, a difference between the charge/discharge power of the hybrid energy storage system and the fourth power reference value is set as a fifth power reference value, the electrochemical energy storage system is controlled to discharge according to the fifth power reference value, and the hydrogen load is started to operate.

Further, the second power distribution control strategy further includes:

in response to $SOC(t) \leq SOC_{min}$ and $SOH(t) \leq SOH_{min}$, setting a product of the charge/discharge power of the hybrid energy storage system and a given compensation coordination coefficient as a sixth power reference value, and controlling the hydrogen fuel cell system to generate electricity according to the sixth power reference value;

in response to $SOC(t) \leq SOC_{min}$ and $SOH_{min}<SOH(t)<SOH_{max}$, or in response to $SOC(t) \leq SOC_{min}$ and $SOH(t) \geq SOH_{max}$, or in response to $SOC_{min}<SOC(t)<SOC_{max}$ and $SOH(t) \geq SOH_{max}$, controlling the hydrogen fuel cell system to generate electricity according to the third power reference value;

in response to $SOC_{min}<SOC(t)<SOC_{max}$ and $SOH(t) \leq SOH_{min}$, or in response to $SOC(t) \geq SOC_{max}$ and $SOH(t) \leq SOH_{min}$, or in response to $SOC_{min}<SOC(t)<SOC_{max}$, $SOH_{min}<SOH(t)<SOH_{max}$, and the charge/discharge power of the hybrid energy storage system being less than the rated maximum output power of the electrochemical energy storage system, controlling the electrochemical energy storage system to discharge according to the third power reference value;

in response to $SOC_{min}<SOC(t)<SOC_{max}$, $SOH_{min}<SOH(t)<SOH_{max}$, and the charge/discharge power of the hybrid energy storage system being greater than or equal to the rated maximum output power of the electrochemical energy storage system, or in response to $SOC(t) \geq SOC_{max}$ and $SOH(t) \geq SOH_{max}$, controlling the electrochemical energy storage system to discharge according to the first power reference value, and controlling the hydrogen fuel cell system to generate electricity according to the second power reference value; and in response to $SOC(t) \geq SOC_{max}$ and $SOH_{min}<SOH(t)<SOH_{max}$, controlling the electrochemical energy storage system to discharge according to the first power reference value.

Further, in response to $SOC(t) \leq SOC_{min}$ and $SOH(t) \leq SOH_{min}$, the hydrogen fuel cell system is controlled to generate electricity according to the sixth power reference value, and at the same time, the microgrid system is connected to a grid so that the DC bus obtains a DC current, a difference between the charge/discharge power of the hybrid energy storage system and the sixth power reference value is set as a seventh power reference value, the electrochemical energy storage system is controlled to be charged according to the seventh power reference value, and the ammonia cracking hydrogen production system is controlled to produce hydrogen.

Further, in response to $SOC_{min}<SOC(t)<SOC_{max}$ and $SOH(t) \leq SOH_{min}$, or in response to $SOC(t) \geq SOC_{max}$ and $SOH(t) \leq SOH_{min}$, the electrochemical energy storage system is controlled to be charged according to the third power reference value, and at the same time, the ammonia cracking hydrogen production system is controlled to produce hydrogen.

Further, the method further includes: maintaining the operating status of the microgrid system unchanged, in response to the charge/discharge power of the hybrid energy storage system being zero.

In accordance with a second aspect of the present disclosure, an embodiment provides an electronic device, including a memory and a processor, where the memory is configured for storing a computer program, and the processor is configured for executing the computer program to implement the method for power distribution control in a microgrid system integrating electricity, hydrogen, and ammonia in accordance with the first aspect.

The present disclosure has the following beneficial effects. When the charge power and the discharge power of the hybrid energy storage system are unbalanced, the operating status of the microgrid system is flexibly adjusted according to the first relationship between the SOC value of the electrochemical energy storage system and the normal SOC range and the second relationship between the SOH value of the hydrogen storage system and the normal SOH range. This can ensure the voltage stability and power balance of the DC bus, consume the output of the photovoltaic generation system as much as possible, reduce the dependence on the electricity distribution network, improve the self-balancing ability of the microgrid system, and effectively extend the service life of the electrochemical energy storage system and the hydrogen storage system.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but are not intended to limit the technical schemes of the present disclosure.

DETAILED DESCRIPTION

Figure 1:
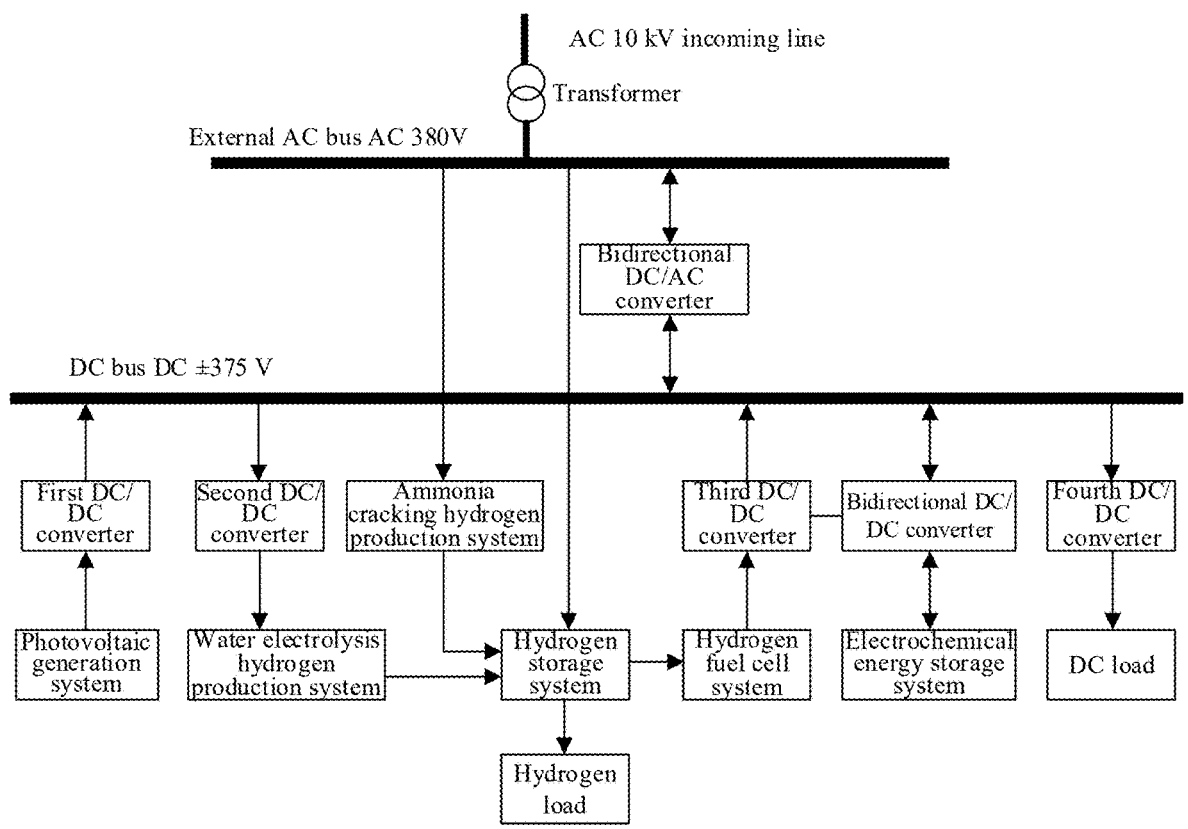
FIG. 1 is a schematic structural diagram of a microgrid system integrating electricity, hydrogen, and ammonia according to an embodiment of the present disclosure.

To make the objectives, technical schemes, and advantages of the present disclosure clearer, the present disclosure is described in further detail in conjunction with accompanying drawings and embodiments. It is to be understood that the specific embodiments described herein are merely used for illustrating the present disclosure, and are not intended to limit the present disclosure.

It is to be noted that although a logical order is shown in the flowcharts, in some cases, the steps shown or described may be performed in an order different from that in the flowcharts. In the specification, claims, or accompanying drawings, the terms "first," "second" or the like are intended to distinguish between similar objects but do not indicate a particular order or sequence. It is to be understood that the data termed in such a way are interchangeable in appropriate circumstances, so that the embodiments of the present disclosure described herein can be implemented in orders other than the order illustrated or described herein.

Unless otherwise defined, meanings of all technical and scientific terms used in this specification are the same as those usually understood by those having ordinary skills in the art to which the present disclosure belongs. Terms used in this specification are merely intended to describe objectives of the embodiments of the present disclosure, but are not intended to limit the present disclosure.

In addition, the described features, structures or characteristics may be combined in one or more embodiments in any appropriate manner. In the following descriptions, a lot of specific details are provided to give a comprehensive understanding of the embodiments of the present disclosure. However, those having ordinary skills in the art are to be aware that, the technical schemes in the present disclosure may be implemented without one or more of the particular details, or another method, unit, apparatus, or step may be used. In other cases, well-known methods, apparatuses, implementations, or steps are not shown or described in detail, to avoid obscuring the aspects of the present disclosure.

The flowcharts shown in the drawings are illustrative only, and neither indicate that all the contents and operations/steps must be included, nor indicate that the operations/steps must be executed in the order described. For example, some operations/steps may be further divided, while some operations/steps may be combined or partially combined. Therefore, an actual execution order may change according to an actual case.

FIG. 1 is a schematic structural diagram of a microgrid system integrating electricity, hydrogen, and ammonia according to an embodiment of the present disclosure. The microgrid system includes: an energy router; a DC bus; a hydrogen storage system; an ammonia cracking hydrogen production system; a hydrogen load; and a water electrolysis hydrogen production system, a photovoltaic generation system, an electrochemical energy storage system, a hydrogen fuel cell system, and a DC load, which are connected to the DC bus through the energy router. The electrochemical energy storage system and the hydrogen storage system constitute a hybrid energy storage system. Basically, the DC bus is connected to an external AC bus through the energy router. The ammonia cracking hydrogen production system is connected to the external AC bus. The hydrogen storage system is connected to the external AC bus. The ammonia cracking hydrogen production system is connected to the hydrogen storage system. The water electrolysis hydrogen production system is connected to the hydrogen storage system. The hydrogen storage system is connected to the hydrogen fuel cell system. The hydrogen storage system is connected to the hydrogen load.

To be specific, the energy router includes a first DC/DC converter, a second DC/DC converter, a third DC/DC converter, a fourth DC/DC converter, a bidirectional DC/DC converter, and a bidirectional DC/AC converter. The photovoltaic generation system is connected to the DC bus through the first DC/DC converter. The water electrolysis hydrogen production system is connected to the DC bus through the second DC/DC converter. The hydrogen fuel cell system is connected to the DC bus through the third DC/DC converter. The DC load is connected to the DC bus through the fourth DC/DC converter. The electrochemical energy storage system is connected to the DC bus through the bidirectional DC/DC converter. The DC bus is connected to the external AC bus through the bidirectional DC/AC converter. The energy router can realize electrical isolation, voltage conversion, and bidirectional flow of electric energy, provides "plug-and-play" standardized interfaces for different levels and forms of sources and loads, and can adjust the voltage and current of each converter in real time.

In practical applications, the photovoltaic generation system captures solar energy and uses the photovoltaic effect to convert the solar energy to electric energy. The electric energy is converted through the first DC/DC converter and then directly connected to the DC bus, to supply electricity to the water electrolysis hydrogen production system or the DC load or to be stored by the electrochemical energy storage system.

The electric energy supplied by the DC bus is subjected to voltage level conversion through the second DC/DC converter and then supplies electricity to the water electrolysis hydrogen production system for consumption. Hydrogen gas produced during the operation of the water electrolysis hydrogen production system is stored in the hydrogen storage system. Hydrogen gas produced during the operation of the ammonia cracking hydrogen production system is also stored in the hydrogen storage system. The hydrogen storage system and the ammonia cracking hydrogen production system are both powered by the external AC bus.

The hydrogen fuel cell system can convert hydrogen gas stored in the hydrogen storage system into electric energy, which is subjected to voltage level conversion through the third DC/DC converter and then connected to the DC bus for compensation. In addition, hydrogen gas stored in the hydrogen storage system may also be supplied to the hydrogen load to further solve the problem of limited capacity of the hydrogen storage system.

The electric energy supplied by the DC bus is subjected to voltage level conversion through the bidirectional DC/DC converter and is then inputted to the electrochemical energy storage system for storage. The electric energy stored in the electrochemical energy storage system is subjected to voltage level conversion through the bidirectional DC/DC converter and is then connected to the DC bus for compensation.

The bidirectional DC/AC converter may be understood as a grid connection port, which is configured for realizing AC-to-DC conversion, DC-to-AC conversion, and bidirectional electricity flow between the DC bus and the external AC bus.

It is be noted that the microgrid system may be deployed in an industrial park, a residential community, an island-type electricity consumption station, a backup station, or other places.

In the microgrid system, the capacities of the electrochemical energy storage system and the hydrogen storage system are limited. When the electrochemical energy storage system or the hydrogen storage system is required to store or discharge energy, if the SOC value of the electrochemical energy storage system and the SOH value of the hydrogen storage system are in a high state or a low state at the same time, the system will be forced to abandon solar power or shed load, which may easily cause the microgrid system to fluctuate or even cause the micro-source to exit operation. To ensure the stable and safe operation of the microgrid system, power distribution control needs to be performed on the related systems included in the microgrid system according to the SOC value of the electrochemical energy storage system and the SOH value of the hydrogen storage system.

Figure 2:
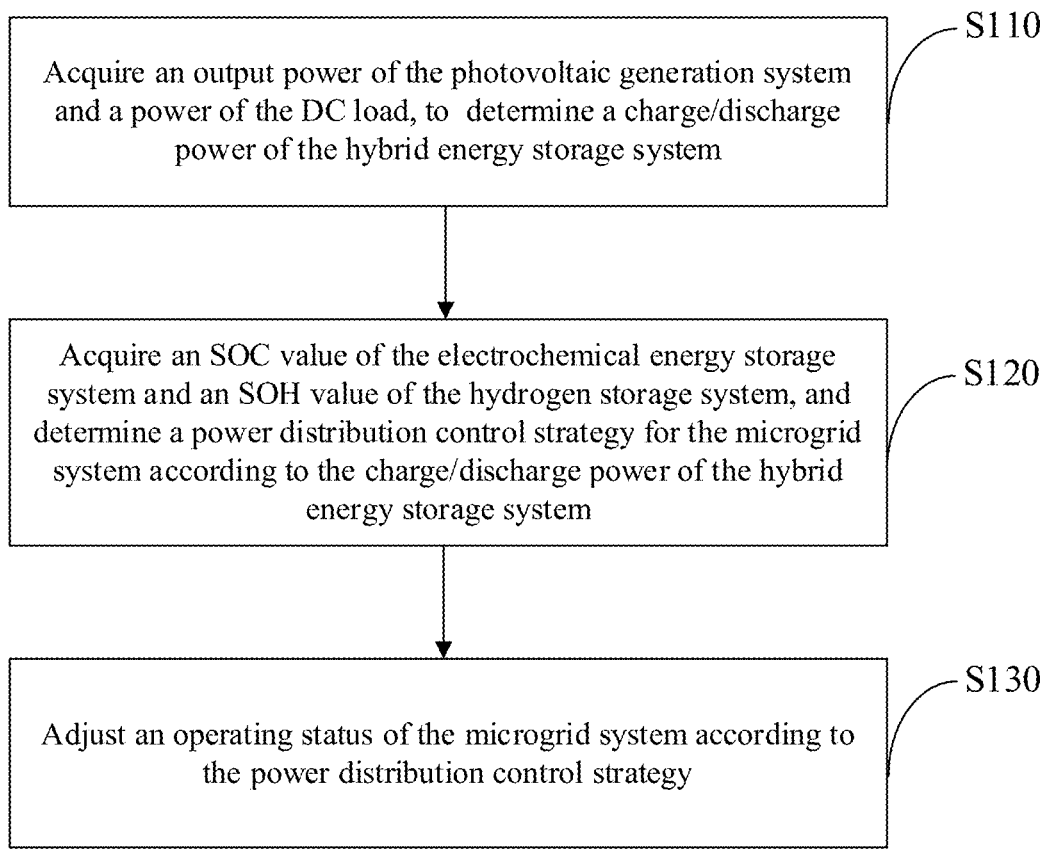
FIG. 2 is a schematic flowchart of a method for power distribution control in a microgrid system integrating electricity, hydrogen, and ammonia according to an embodiment of the present disclosure.

Based on this, FIG. 2 is a schematic flowchart of a method for power distribution control in a microgrid system integrating electricity, hydrogen, and ammonia according to an embodiment of the present disclosure. The method includes the following steps.

In a step of S110, an output power of the photovoltaic generation system and a power of the DC load are acquired, to determine a charge/discharge power of the hybrid energy storage system.

The charge/discharge power of the hybrid energy storage system is a difference between the output power of the photovoltaic generation system and the power of the DC load.

In a step of S120, an SOC value of the electrochemical energy storage system and an SOH value of the hydrogen storage system are acquired, to determine a power distribution control strategy for the microgrid system in combination with the charge/discharge power of the hybrid energy storage system.

In a step of S130, an operating status of the microgrid system is adjusted according to the power distribution control strategy.

In some embodiments of the present disclosure, the SOH value of the hydrogen storage system and the SOC value of the electrochemical energy storage system in the above step S120 are first described as follows.

(1) A hydrogen storage tank is used as an energy storage unit of the hydrogen storage system, and the SOH value of the hydrogen storage system is determined by a ratio of a maximum internal pressure of the hydrogen storage system to an internal pressure of the hydrogen storage system, i.e., $$\begin{cases} SOH(t) = \dfrac{P_{ST}(t)}{P_{ST_{max}}} \\ P_{ST}(t) = \dfrac{m_{ST}(t)RT_{ST}(t)}{V_{ST}} \\ m_{ST}(t) = m_{ST}(t-1) + [v_{STin}(t) - v_{STout}(t)] \end{cases}$$

where $SOH(t)$ is an SOH value of the hydrogen storage system at a moment t, $P_{ST}(t)$ is an internal pressure of the hydrogen storage system at the moment t, $P_{ST\ max}$ is a maximum internal pressure of the hydrogen storage system at the moment t, $m_{ST}(t)$ is an amount of hydrogen stored in the hydrogen storage system at the moment t, R is the gas constant, $T_{ST}(t)$ is an internal gas thermodynamic temperature of the hydrogen storage system at the moment t, $V_{ST}$ is a geometric volume of the hydrogen storage system, $m_{ST}(t-1)$ is an amount of hydrogen stored in the hydrogen storage system at a moment t−1, $v_{STin}(t)$ is a hydrogen charging rate of the hydrogen storage system at the moment t, and $v_{STout}(t)$ is a hydrogen discharging rate of the hydrogen storage system at the moment t.

(2) A lithium-ion battery is used as an energy storage unit of the electrochemical energy storage system, and the following mathematical model is satisfied:

$$U_{BAT}(t) = E_0 - K_e \frac{Q}{Q-I_t} I_t + A_b e^{-Bl_t} - R_{res} I^* - R_b I_{BAT}(t).$$

The SOC value of the electrochemical energy storage system is defined as a ratio of a remaining capacity of the lithium-ion battery to a maximum capacity of the lithium-ion battery to reflect the actual availability of the lithium-ion battery, and may be calculated using the following expression $$SOC(t) = \left[1 - \frac{1}{Q}\int_0^t I_{BAT}(t)dt\right] \times 100\%$$

where when the lithium-ion battery is in a charging state, $U_{BAT}(t)$ is an input voltage of the lithium-ion battery, and $I_{BAT}(t)$ is an input current of the lithium-ion battery; when the lithium-ion battery is in a discharging state, $U_{BAT}(t)$ is an output voltage of the lithium-ion battery, $I_{BAT}(t)$ is an output current of the lithium-ion battery; $E_0$ is a voltage constant of the lithium-ion battery; $K_e$ is a polarization constant of the lithium-ion battery; Q is a maximum capacity of the lithium-ion battery; $I_t$ is extractable electric energy of the lithium-ion battery; $I^*$ is a low-frequency dynamic current of the lithium-ion battery; $A_b$ is an amplitude of an exponential region; B is a time constant inverse of the exponential region; $R_{res}$ is a polarization resistance of the lithium-ion battery; $R_b$ is an internal resistance of the lithium-ion battery; $SOC(t)$ is an SOC value of the electrochemical energy storage system at the moment t; when $SOC(t)=0$, it indicates that the lithium-ion battery has been fully discharged; and when $SOC(t)=1$, it indicates that the lithium-ion battery has been fully charged.

In some embodiments of the present disclosure, an implementation process of the above step S120 includes, but is not limited to, the following steps.

In a step of S121, the SOC value and a normal SOC range of the electrochemical energy storage system are acquired, to determine a first relationship between the SOC value and the normal SOC range of the electrochemical energy storage system.

The normal SOC range of the electrochemical energy storage system is defined as $(SOC_{min}, SOC_{max})$. Considering the service life and performance of the electrochemical energy storage system, preferably, a minimum SOC limit value of $SOC_{min}=0.25$ and a maximum SOC limit value of $SOC_{max}=0.85$ are set, and the first relationship is $SOC(t) \leq SOC_{min}$ or $SOC_{min}<SOC(t)<SOC_{max}$ or $SOC(t) \geq SOC_{max}$.

In a step of S122, the SOH value and a normal SOH range of the hydrogen storage system are acquired, and a second relationship between the SOH value and the normal SOH range of the hydrogen storage system is determined.

The normal SOH range of the hydrogen storage system is defined as ($SOH_{min}$, $SOH_{max}$). Considering the service life and performance of the hydrogen storage system, preferably, a minimum SOH limit value of $SOH_{min}$=0.2 and a maximum SOH limit value of $SOH_{max}$=0.75 are set, and the second relationship is $SOH(t) \leq SOH_{min}$ or $SOH_{min} < SOH(t) < SOH_{max}$ or $SOH(t) \geq SOH_{max}$.

In a step of S123, it is determined whether the charge/discharge power of the hybrid energy storage system is greater than, equal to, or less than zero.

To be specific, the charge/discharge power of the hybrid energy storage system is defined as $P_{BHF}(t)$. When $P_{BHF}(t)>0$, S124 is executed; when $P_{BHF}(t)<0$, S125 is executed; when $P_{BHF}(t)=0$, the operating status of the microgrid system is maintained unchanged.

In a step of S124, a first power distribution control strategy is determined according to the first relationship, the second relationship, and the charge/discharge power of the hybrid energy storage system. The first power distribution control strategy mainly includes controlling the water electrolysis hydrogen production system to produce hydrogen and/or controlling the electrochemical energy storage system to be charged.

In a step of S125, a second power distribution control strategy is determined according to the first relationship, the second relationship, and the charge/discharge power of the hybrid energy storage system. The second power distribution control strategy mainly includes controlling the hydrogen fuel cell system to generate electricity and/or controlling the electrochemical energy storage system to discharge.

Before the first power distribution control strategy in the above step S124 and the second power distribution control strategy in the above step S125 are described, related parameters are set as follows.

A rated maximum output power of the electrochemical energy storage system is defined as $P_{BE\ max}$. The rated maximum output power $P_{BE\ max}$ of the electrochemical energy storage system is defined as a first power reference value. A difference between the charge/discharge power $P_{BHF}(t)$ of the hybrid energy storage system and the rated maximum output power $P_{BE\ max}$ of the electrochemical energy storage system is defined as a second power reference value. The charge/discharge power $P_{BHF}(t)$ of the hybrid energy storage system is defined as a third power reference value. A product of the charge/discharge power $P_B(t)$ of the hybrid energy storage system and a preset consumption coordination coefficient $k_{21}$ is defined as a fourth power reference value. A difference between the charge/discharge power $P_{BHF}(t)$ of the hybrid energy storage system and the fourth power reference value is defined as a fifth power reference value. A product of the charge/discharge power $P_{BHF}(t)$ of the hybrid energy storage system and a preset compensation coordination coefficient $k_{22}$ is defined as a sixth power reference value. A difference between the charge/discharge power $P_{BHF}(t)$ of the hybrid energy storage system and the sixth power reference value is defined as a seventh power reference value. The value of the consumption coordination coefficient $k_2$, ranges from 0.3 to 0.7, and the value of the compensation coordination coefficient $k_{22}$ ranges from 0.2 to 0.8.

To be specific, the first power distribution control strategy in the above step S124 may include the following six cases.

First case: When $SOC(t) \leq SOC_{min}$ and $SOH(t) \leq SOH_{min}$, first, the electrochemical energy storage system is controlled to be charged according to the first power reference value until the SOC value of the electrochemical energy storage system is $k_{11}$ ($SOC_{max}-SOC_{min}$), where $k_{11}$ is a consumption SOC adjustment coefficient, the value of $k_{11}$ ($SOC_{max}-SOC_{min}$) is defined to range from 0.4 to 0.6 (or the value of $k_{11}$ is defined to range from 0.8 to 1.2), and in this case, a power reference value for charging of the electrochemical energy storage system is set to $P_{Bref}=P_{BE\ max}$; and then the water electrolysis hydrogen production system is controlled to produce hydrogen according to the second power reference value, i.e., a power reference value for hydrogen production of the water electrolysis hydrogen production system is set to $P_{Href}=P_{BS}(t)-P_{BE\ max}$, to restore the amount of hydrogen stored in the hydrogen storage system, so that the SOH value of the hydrogen storage system gradually increases.

In an optional implementation, after the electrochemical energy storage system is controlled to be charged according to the first power reference value, the ammonia cracking hydrogen production system is directly controlled to produce hydrogen according to the rated maximum output power, to restore the amount of hydrogen stored in the hydrogen storage system, so that the SOH value of the hydrogen storage system gradually increases.

Second case: When $SOC(t) \leq SOC_{min}$ and $SOH_{min} < SOH(t) < SOH_{max}$, the electrochemical energy storage system is controlled to be charged according to the third power reference value, i.e., a power reference value for charging of the electrochemical energy storage system is set to $P_{Bref}=P_{BHF}(t)$, thus achieving consumption.

Third case: When $SOC(t) \leq SOC_{min}$ and $SOH(t) \geq SOH_{max}$, or when $SOC_{min} < SOC(t) < SOC_{max}$ and $SOH(t) \geq SOH_{max}$, the electrochemical energy storage system is controlled to be charged according to the third power reference value, i.e., a power reference value for charging of the electrochemical energy storage system is set to $P_{Bref}=P_{BHF}(t)$, thus achieving consumption; and at the same time, the hydrogen load is controlled to operate, so that the SOH value of the hydrogen storage system gradually decreases to the normal SOH range.

Fourth case: When $SOC_{min} < SOC(t) < SOC_{max}$ and $SOH(t) \leq SOH_{min}$, or when $SOC(t) \geq SOC_{max}$ and $SOH(t) \leq SOH_{min}$, or when $SOC(t) \geq SOC_{max}$ and $SOH_{min} < SOH(t) < SOH_{max}$, the water electrolysis hydrogen production system is controlled to produce hydrogen according to the third power reference value, i.e., a power reference value for hydrogen production of the water electrolysis hydrogen production system is set to $P_{Href}=P_{BHF}(t)$, thus achieving consumption.

Fifth case: When $SOC_{min} < SOC(t) < SOC_{max}$ and $SOH_{min} < SOH(t) < SOH_{max}$: if $P_{BHF}(t) < P_{BE\ max}$, the electrochemical energy storage system is controlled to be charged according to the third power reference value, i.e., a power reference value for charging of the electrochemical energy storage system is set to $P_{Bref}=P_{BHF}(t)$, thus achieving consumption; and if $P_{BHF}(t) \geq P_{BE\ max}$, first, the electrochemical energy storage system is controlled to be charged according to the first power reference value, i.e., a power reference value for charging of the electrochemical energy storage system is set to $P_{Bref}=P_{BE\ max}$, and then the water electrolysis hydrogen production system is controlled to produce hydrogen according to the second power reference value, i.e., a power reference value for hydrogen production of the water electrolysis hydrogen production system is set to $P_{Href}=P_{BHF}(t)-P_{BE\ max}$, thus achieving consumption.

Sixth case: When $SOC(t) \geq SOC_{max}$ and $SOH(t) \geq SOH_{max}$, the water electrolysis hydrogen production system is controlled to produce hydrogen according to the fourth power reference value, i.e., a power reference value for hydrogen production of the water electrolysis hydrogen production system is set to $P_{Href}=k_{21}P_{BHF}(t)$ thus achieving consumption.

Meanwhile, the following two auxiliary control actions need to be made: ① controlling the microgrid system to connect to a grid, starting the bidirectional DC/AC converter to feed back an alternating current to the external AC bus, and controlling the electrochemical energy storage system to discharge according to the fifth power reference value, i.e., setting a power reference value for discharging of the electrochemical energy storage system to $P_{Bref}=(1-k_{21})P_{BHF}(t)$, so that the SOC value of the electrochemical energy storage system gradually decreases to the normal SOC range; and ② controlling the hydrogen load to operate to restore the amount of hydrogen stored in the hydrogen storage system, so that the SOH value of the hydrogen storage system gradually decreases to the normal SOH range.

To be specific, the second power distribution control strategy in the above step S125 may include the following six cases.

First case: When $SOC(t) \leq SOC_{min}$ and $SOH(t) \leq SOH_{min}$, the hydrogen fuel cell system is controlled to generate electricity according to the sixth power reference value, i.e., a power reference value for electricity generation of the hydrogen fuel cell system is set to $P_{Fref}=k_{22}P_{BHF}(t)$.

Meanwhile, the following two auxiliary control actions need to be made: ① controlling the microgrid system to connect to a grid, starting the bidirectional DC/AC converter so that the DC bus obtains a DC current, and controlling the electrochemical energy storage system to be charged according to the seventh power reference value, i.e., setting a power reference value for charging of the electrochemical energy storage system to $P_{Bref}=(1-k_{22})P_{BHF}(t)$, so that the SOC value of the electrochemical energy storage system gradually increases to the normal SOC range; and ② controlling the ammonia cracking hydrogen production system to produce hydrogen according to the rated maximum output power, to restore the amount of hydrogen stored in the hydrogen storage system, so that the SOH value of the hydrogen storage system gradually increases to the normal SOH range.

Second case: When $SOC(t) \leq SOC_{min}$ in and $SOH_{min} < SOH(t) < SOH_{max}$, or when $SOC(t) \leq SOC_{min}$ and $SOH(t) \geq SOH_{max}$, or when $SOC_{min} < SOC(t) < SOC_{max}$ and $SOH(t) \geq SOH_{max}$, the hydrogen fuel cell system is controlled to generate electricity according to the third power reference value, i.e., a power reference value for electricity generation of the hydrogen fuel cell system is set to $P_{Fref}=P_{BHF}(t)$, thus achieving compensation.

Third case: When $SOC_{min} < SOC(t) < SOC_{max}$ and $SOH(t) \leq SOH_{min}$, or when $SOC(t) \geq SOC_{max}$ and $SOH(t) \leq SOH_{min}$, the electrochemical energy storage system is controlled to discharge according to the third power reference value, i.e., a power reference value for discharging of the electrochemical energy storage system is set to $P_{Bref}=P_{BHF}(t)$, thus achieving compensation; and at the same time, controlling the ammonia cracking hydrogen production system to produce hydrogen according to the rated maximum output power, so that the SOH value of the hydrogen storage system gradually increases to the normal SOH range.

Fourth case: When $SOC_{min} < SOC(t) < SOC_{max}$ and $SOH_{min} < SOH(t) < SOH_{max}$: if $P_{BHF}(t) < P_{BE\ max}$, the electrochemical energy storage system is controlled to discharge according to the third power reference value, i.e., a power reference value for discharging of the electrochemical energy storage system is set to $P_{Bref}=P_{BHF}(t)$, thus achieving compensation; and if $P_{BHF}(t) \geq P_{BE\ max}$ first, the electrochemical energy storage system is controlled to discharge according to the first power reference value, i.e., a power reference value for discharging of the electrochemical energy storage system is set to $P_{Bref}=P_{BE\ max}$, and then the hydrogen fuel cell system is controlled to generate electricity according to the second power reference value, i.e., a power reference value for electricity generation of the hydrogen fuel cell system is set to $P_{Fref}=P_{BHF}(t)-P_{BE\ max}$, thus achieving compensation.

Fifth case: When $SOC(t) \geq SOC_{max}$ and $SOH_{min} < SOH(t) < SOH_{max}$, the electrochemical energy storage system is controlled to discharge according to the first power reference value, i.e., a power reference value for discharging of the electrochemical energy storage system is set to $P_{Bref}=P_{BE\ max}$, thus achieving compensation.

Sixth case: When $SOC(t) \geq SOC_{max}$ and $SOH(t) \geq SOH_{max}$, the electrochemical energy storage system is controlled to discharge according to the first power reference value until the SOC value of the electrochemical energy storage system is $k_{12}(SOC_{max}-SOC_{min})$, where $k_{12}$ is a compensation SOC adjustment coefficient, the value of $k_{12}(SOC_{max}-SOC_{min})$ is defined to range from 0.3 to 0.4 (or the value of $k_{12}$ is defined to range from 0.6 to 0.8), and then the hydrogen fuel cell system is controlled to generate electricity according to the second power reference value, i.e., a power reference value for electricity generation of the hydrogen fuel cell system is set to $F_{ref}=P_{BHF}(t)-P_{BE\ max}$, so that the SOH value of the hydrogen storage system gradually decreases to the normal SOH range.

Further, the control of the operation of the electrochemical energy storage system, the water electrolysis hydrogen production system, and the hydrogen fuel cell system is described as follows.

(1) To control the electrochemical energy storage system to be charged or discharge according to a corresponding power reference value $P_{Bref}$, a measured voltage $U_{DC}$ and a reference voltage $U_{DCref}$ of the DC bus are acquired, and a measured terminal current $I_B$ of the electrochemical energy storage system is acquired. The measured voltage $U_{DC}$ and the reference voltage $U_{DCref}$ are analyzed using a preset first control strategy to obtain a reference voltage $U_{Bref}$ of the electrochemical energy storage system. The power reference value $P_{Bref}$ is divided by the reference voltage $U_{Bref}$ to obtain a reference current $I_{Bref}$ of the electrochemical energy storage system. The reference current $I_{Bref}$ and the measured terminal current $I_B$ are analyzed using a preset second control strategy to obtain a duty cycle $u_B$ required for operation of the electrochemical energy storage system. The bidirectional DC/DC converter is controlled to respond to the duty cycle $u_B$ to change the output power of the electrochemical energy storage system.

(2) To control the water electrolysis hydrogen production system to produce hydrogen according to a corresponding power reference value $P_{Href}$, a measured terminal voltage $U_H$ and a measured terminal current $I_H$ of the water electrolysis hydrogen production system are acquired. The power reference value $P_{Href}$ is divided by the measured terminal voltage $U_H$ to obtain a reference current $I_{Href}$ of the water electrolysis hydrogen production system. The reference current $I_{Href}$ and the measured terminal current $I_H$ are analyzed using a preset third control strategy to obtain a duty cycle $u_H$ required for operation of the water electrolysis hydrogen production system. The second DC/DC converter is controlled to respond to the duty cycle $u_H$ to change the output power of the water electrolysis hydrogen production system.

(3) To control the hydrogen fuel cell system to generate electricity according to a corresponding power reference value $P_{Fref}$, a measured terminal voltage $U_F$, and a measured terminal current $I_F$ of the hydrogen fuel cell system are acquired. The power reference value $P_{Fref}$ is divided by the measured terminal voltage $U_F$ to obtain a reference current $I_{Fref}$ of the hydrogen fuel cell system. The reference current $I_{Fref}$ and the measured terminal current $I_F$ are analyzed using a preset fourth control strategy to obtain a duty cycle $u_F$ required for operation of the hydrogen fuel cell system. The third DC/DC converter is controlled to respond to the duty cycle $u_F$ to change the output power of the hydrogen fuel cell system.

The first control strategy, the second control strategy, the third control strategy, and the fourth control strategy may be, but are not limited to, an existing PID control strategy, a fuzzy control strategy, or a neural network control strategy.

In the embodiments of the present disclosure, when the charge power and the discharge power of the hybrid energy storage system are unbalanced, the operating status of the microgrid system is flexibly adjusted according to the first relationship between the SOC value of the electrochemical energy storage system and the normal SOC range and the second relationship between the SOH value of the hydrogen storage system and the normal SOH range. This can ensure the voltage stability and power balance of the DC bus, consume the output of the photovoltaic generation system as much as possible, reduce the dependence on the electricity distribution network, improve the self-balancing ability of the microgrid system, and effectively extend the service life of the electrochemical energy storage system and the hydrogen storage system.

In addition, an embodiment of the present disclosure provides a computer-readable storage medium, having a computer program stored thereon. The computer program, when executed by a processor, causes the processor to implement the method for power distribution control in a microgrid system integrating electricity, hydrogen, and ammonia in accordance with the above embodiments. The computer-readable storage medium includes, but is not limited to, any type of disk (e.g., floppy disk, hard disk, optical disk, compact disc read-only memory (CD-ROM), magneto-optical disk, etc.), a read-only memory (ROM), a random access memory (RAM), an erasable programmable read-only memory (EPROM), an electrically erasable programmable read-only memory (EEPROM), a flash memory, a magnetic card, or an optical card. In other words, a storage device includes any medium on which information is stored or transmitted in a readable form by a device (e.g., a computer, a mobile phone, etc.), and may be a read-only memory, a magnetic disk, or an optical disk, etc.

Figure 3:
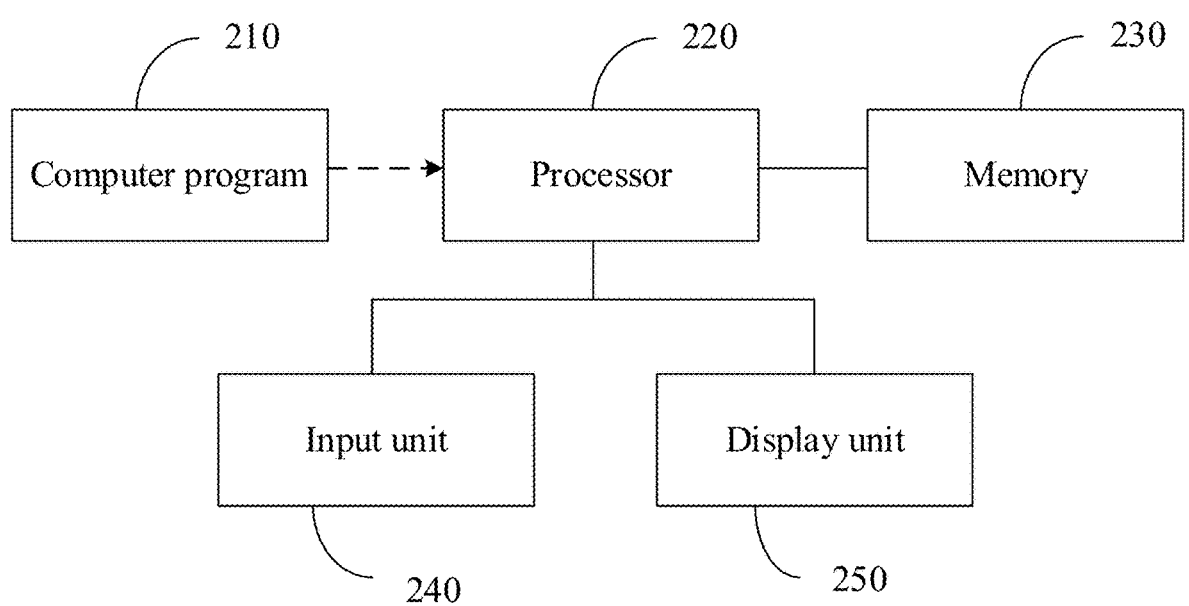
FIG. 3 is a schematic structural diagram of hardware of a computer device according to an embodiment of the present disclosure.

FIG. 3 is a schematic structural diagram of hardware of a computer device according to an embodiment of the present disclosure. The computer device includes a processor 220, a memory 230, an input unit 240, a display unit 250, and other components. It can be understood by those having ordinary skills in the art that the structure of the computer device shown in FIG. 3 does not constitute a limitation on the computer device, and the computer device may include more components or fewer components than those shown in the figure, or some components may be combined. The memory 230 may be configured for storing a computer program 210 and various functional modules. The processor 220 runs the computer program 210 stored in the memory 230 to execute various functional applications and data processing of the computer device. The memory may be an internal memory or an external memory, or may include an internal memory and an external memory. The internal memory may include a read-only memory (ROM), a programmable ROM (PROM), an electrically programmable ROM (EPROM), an electrically erasable programmable ROM (EEPROM), a flash memory, or a random access memory. The external memory may include a hard disk, a floppy disk, a USB flash drive, a magnetic tape, etc. The memory 230 disclosed in the embodiments of the present disclosure includes, but is not be limited to, these types of memories described above. The memory 230 disclosed in the embodiments of the present disclosure is merely an example and is not limiting.

The input unit 240 is configured for receiving an inputted signal and receiving a keyword inputted by a user. The input unit 240 may include a touch panel and other input devices. The touch panel may collect a touch operation performed by a user on or near the touch panel (such as an operation performed by a user on or near the touch panel using any suitable object or attachment, such as a finger or a stylus), and drive a corresponding connection apparatus according to a preset program. The other input devices may include, but are not limited to, one or more of a physical keyboard, a functional key (such as a play control key or a switch key), a track ball, a mouse, and a joystick. The display unit 250 may be configured for displaying information inputted by the user or information provided for the user, and various menus of a terminal device. The display unit 250 may be implemented using a liquid crystal display, an organic light-emitting diode, etc. The processor 220 is a control center of the terminal device, and is connected to various parts of the terminal device through various interfaces and lines. By running or executing a software program and/or module stored in the memory 230 and invoking data stored in the memory 230, the processor 220 performs various functions and processes data.

In an embodiment, the computer device includes a processor 220, a memory 230, and a computer program 210, where the computer program 210 is stored in the memory 230 and is configured for being executed by the processor 220, and the computer program 210 is configured for executing the method for power distribution control in a microgrid system integrating electricity, hydrogen, and ammonia in accordance with the above embodiments.

In the specification and accompanying drawings of the present disclosure, the terms "include," "comprise," and any other variants thereof mean are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device.

It is to be understood that in the present disclosure, "at least one" means one or more and "a plurality of" means two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relationship between the associated objects. "At least one of" and similar expressions refer to any combination of items listed, including one item or any combination of a plurality of items. For example, at least one of a, b, or c may represent a, b, c, "a and b," "a and c," "b and c," or "a, b, and c", where a, b, and c may be singular or plural.

Although the present disclosure has been described in considerable detail and particularly with respect to the above embodiments, the present disclosure is not intended to be limited to any of these details or embodiments or any particular embodiment, but should be considered to be effectively covered by the intended scope of the present disclosure by referring to the appended claims and taking into account the prior art to provide a broad possible interpretation of these claims. In addition, the above description of the present disclosure based on the contemplated embodiments is for the purpose of providing a useful description, and those insubstantial modifications to the present disclosure that are not currently foreseen may still represent equivalent modifications to the present disclosure.

What is claimed is:

1. A method for power distribution control in a microgrid system integrating electricity, hydrogen, and ammonia, wherein the microgrid system comprises: a direct current (DC) bus; an energy router; an ammonia cracking hydrogen production system; a hydrogen storage system; and a photovoltaic generation system, a water electrolysis hydrogen production system, a hydrogen fuel cell system, an electrochemical energy storage system, and a DC load, which are connected to the DC bus through the energy router; wherein the DC bus is connected to an external alternating current (AC) bus through the energy router, the ammonia cracking hydrogen production system and the hydrogen storage system are respectively connected to the external AC bus, the ammonia cracking hydrogen production system and the water electrolysis hydrogen production system are respectively connected to the hydrogen storage system, the hydrogen storage system is connected to the hydrogen fuel cell system, and the hydrogen storage system and the electrochemical energy storage system constitute a hybrid energy storage system, and the method comprises:

acquiring an output power of the photovoltaic generation system and a power of the DC load, to determine a charge/discharge power of the hybrid energy storage system;

acquiring a state of charge (SOC) value of the electrochemical energy storage system and a state of health (SOH) value of the hydrogen storage system, to determine a power distribution control strategy for the microgrid system in combination with the charge/discharge power of the hybrid energy storage system; and adjusting an operating status of the microgrid system according to the power distribution control strategy, wherein determining a power distribution control strategy for the microgrid system comprises:

acquiring a normal SOC range ($SOC_{min}$, $SOC_{max}$) of the electrochemical energy storage system and determining a first relationship between the SOC value of the electrochemical energy storage system and the normal SOC range;

acquiring a normal SOH range ($SOH_{min}$, $SOH_{max}$) of the hydrogen storage system and determining a second relationship between the SOH value of the hydrogen storage system and the normal SOH range;

in response to the charge/discharge power of the hybrid energy storage system being greater than zero, determining a first power distribution control strategy according to the first relationship and the second relationship, wherein the first power distribution control strategy comprises controlling the electrochemical energy storage system to be charged and/or controlling the water electrolysis hydrogen production system to produce hydrogen; and in response to the charge/discharge power of the hybrid energy storage system being less than zero, determining a second power distribution control strategy according to the first relationship and the second relationship, wherein the second power distribution control strategy comprises controlling the electrochemical energy storage system to discharge and/or controlling the hydrogen fuel cell system to generate electricity;

wherein the first power distribution control strategy further comprises:

in response to $SOC(t) \leq SOC_{min}$ and $SOH(t) \leq SOH_{min}$, or in response to $SOC_{min} < SOC(t) < SOC_{max}$, $SOH_{min} < SOH(t) < SOH_{max}$, and the charge/discharge power of the hybrid energy storage system being greater than or equal to a rated maximum output power of the electrochemical energy storage system, setting the rated maximum output power of the electrochemical energy storage system as a first power reference value, setting a difference between the charge/discharge power of the hybrid energy storage system and the rated maximum output power of the electrochemical energy storage system as a second power reference value, controlling the electrochemical energy storage system to be charged according to the first power reference value, and controlling the water electrolysis hydrogen production system to produce hydrogen according to the second power reference value;

in response to $SOC(t) \leq SOC_{min}$ and $SOH_{min} < SOH(t) < SOH_{max}$, or in response to $SOC(t) \leq SOC_{min}$ and $SOH(t) \geq SOH_{max}$, or in response to $SOC_{min} < SOC(t) < SOC_{max}$ and $SOH(t) \geq SOH_{max}$, setting the charge/discharge power of the hybrid energy storage system as a third power reference value, and controlling the electrochemical energy storage system to be charged according to the third power reference value;

in response to $SOC_{min} < SOC(t) < SOC_{max}$ and $SOH(t) \leq SOH_{min}$, or in response to $SOC(t) \geq SOC_{max}$ and $SOH(t) \leq SOH_{min}$, or in response to $SOC(t) \geq SOC_{max}$ and $SOH_{min} < SOH(t) < SOH_{max}$, controlling the water electrolysis hydrogen production system to produce hydrogen according to the third power reference value;

in response to $SOC_{min} < SOC(t) < SOC_{max}$, $SOH_{min} < SOH(t) < SOH_{max}$, and the charge/discharge power of the hybrid energy storage system being less than the rated maximum output power of the electrochemical energy storage system, controlling the electrochemical energy storage system to be charged according to the third power reference value; and in response to $SOC(t) \geq SOC_{max}$ and $SOH(t) \geq SOH_{max}$, setting a product of the charge/discharge power of the hybrid energy storage system and a given consumption coordination coefficient as a fourth power reference value, and controlling the water electrolysis hydrogen production system to produce hydrogen according to the fourth power reference value.

2. The method for power distribution control in a microgrid system integrating electricity, hydrogen, and ammonia of claim 1, wherein the microgrid system further comprises a hydrogen load connected to the hydrogen storage system; and in response to $SOC(t) \leq SOC_{min}$ and $SOH(t) \geq SOH_{max}$, or in response to $SOC_{min} < SOC(t) < SOC_{max}$ and $SOH(t) \geq SOH_{max}$, controlling the electrochemical energy storage system to be charged according to the third power reference value, and at the same time, starting the hydrogen load to operate.

3. The method for power distribution control in a microgrid system integrating electricity, hydrogen, and ammonia of claim 2, wherein in response to $SOC(t) \geq SOC_{max}$ and $SOH(t) \geq SOH_{max}$, the water electrolysis hydrogen production system is controlled to produce hydrogen at the fourth power reference value, and at the same time, the microgrid system is connected to a grid to feed back an alternating current to the external AC bus, a difference between the charge/discharge power of the hybrid energy storage system and the fourth power reference value is set as a fifth power reference value, the electrochemical energy storage system is controlled to discharge according to the fifth power reference value, and the hydrogen load is started to operate.

4. The method for power distribution control in a microgrid system integrating electricity, hydrogen, and ammonia of claim 1, wherein the second power distribution control strategy further comprises:
  in response to $SOC(t) \leq SOC_{min}$ and $SOH(t) \leq SOH_{min}$, setting a product of the charge/discharge power of the hybrid energy storage system and a given compensation coordination coefficient as a sixth power reference value, and controlling the hydrogen fuel cell system to generate electricity according to the sixth power reference value;
  in response to $SOC(t) \leq SOC_{min}$ and $SOH_{min} < SOH(t) < SOH_{max}$, or in response to $SOC(t) \leq SOC_{min}$ and $SOH(t) \geq SOH_{max}$, or in response to $SOC_{min} < SOC(t) < SOC_{max}$ and $SOH(t) \geq SOH_{max}$, controlling the hydrogen fuel cell system to generate electricity according to the third power reference value;
  in response to $SOC_{min} < SOC(t) < SOC_{max}$ and $SOH(t) \leq SOH_{min}$, or in response to $SOC(t) \geq SOC_{max}$ and $SOH(t) \leq SOH_{min}$, or in response to $SOC_{min} < SOC(t) < SOC_{max}$, $SOH_{min} < SOH(t) < SOH_{max}$, and the charge/discharge power of the hybrid energy storage system being less than the rated maximum output power of the electrochemical energy storage system, controlling the electrochemical energy storage system to discharge according to the third power reference value;
  in response to $SOC_{min} < SOC(t) < SOC_{max}$, $SOH_{min} < SOH(t) < SOH_{max}$, and the charge/discharge power of the hybrid energy storage system being greater than or equal to the rated maximum output power of the electrochemical energy storage system, or in response to $SOC(t) \geq SOC_{max}$ and $SOH(t) \geq SOH_{max}$, controlling the electrochemical energy storage system to discharge according to the first power reference value, and controlling the hydrogen fuel cell system to generate electricity according to the second power reference value; and
  in response to $SOC(t) \geq SOC_{max}$ and $SOH_{min} < SOH(t) < SOH_{max}$, controlling the electrochemical energy storage system to discharge according to the first power reference value.

5. The method for power distribution control in a microgrid system integrating electricity, hydrogen, and ammonia of claim 4, wherein in response to $SOC(t) \leq SOC_{min}$ and $SOH(t) \leq SOH_{min}$, the hydrogen fuel cell system is controlled to generate electricity according to the sixth power reference value, and at the same time, the microgrid system is connected to a grid so that the DC bus obtains a DC current, a difference between the charge/discharge power of the hybrid energy storage system and the sixth power reference value is set as a seventh power reference value, the electrochemical energy storage system is controlled to be charged according to the seventh power reference value, and the ammonia cracking hydrogen production system is controlled to produce hydrogen.

6. The method for power distribution control in a microgrid system integrating electricity, hydrogen, and ammonia of claim 4, wherein in response to $SOC_{min} < SOC(t) < SOC_{max}$ and $SOH(t) \leq SOH_{min}$, or in response to $SOC(t) \geq SOC_{max}$ and $SOH(t) \leq SOH_{min}$, the electrochemical energy storage system is controlled to be charged according to the third power reference value, and at the same time, the ammonia cracking hydrogen production system is controlled to produce hydrogen.

7. The method for power distribution control in a microgrid system integrating electricity, hydrogen, and ammonia of claim 1, further comprising: maintaining the operating status of the microgrid system unchanged, in response to the charge/discharge power of the hybrid energy storage system being zero.

8. A computer device, comprising a memory and a processor, wherein the memory is configured for storing a computer program, and the processor is configured for executing the computer program to perform the method for power distribution control in a microgrid system integrating electricity, hydrogen, and ammonia of claim 1.

* * * * *